United States Patent
Kojo

(10) Patent No.: US 8,803,921 B2
(45) Date of Patent: Aug. 12, 2014

(54) IMAGE DISPLAY APPARATUS, IMAGE DISPLAY METHOD AND RECORDING MEDIUM RECORDING AN IMAGE DISPLAY PROGRAM

(75) Inventor: Takashi Kojo, Ome (JP)

(73) Assignee: Casio Computer Co., Ltd., Tokyo (JP)

(*) Notice: Subject to any disclaimer, the term of this patent is extended or adjusted under 35 U.S.C. 154(b) by 323 days.

(21) Appl. No.: 13/234,002

(22) Filed: Sep. 15, 2011

(65) Prior Publication Data
US 2012/0069053 A1 Mar. 22, 2012

(30) Foreign Application Priority Data
Sep. 16, 2010 (JP) ................................ 2010-207434

(51) Int. Cl.
*G09G 5/00* (2006.01)
*G06K 9/62* (2006.01)

(52) U.S. Cl.
USPC ............................. 345/671; 382/224; 345/660

(58) Field of Classification Search
CPC ..................... G06K 9/00664; G06F 17/30265; G06F 17/30247; G06T 3/40
USPC ........................................... 345/671; 382/224
See application file for complete search history.

(56) References Cited

U.S. PATENT DOCUMENTS
2005/0105806 A1* 5/2005 Nagaoka et al. .............. 382/224

FOREIGN PATENT DOCUMENTS
| JP | 7-295873 A | 11/1995 |
| JP | 2003-076693 A | 3/2003 |
| JP | 2007-189340 A | 7/2007 |

* cited by examiner

*Primary Examiner* — Xiao Wu
*Assistant Examiner* — Scott E Sonners
(74) *Attorney, Agent, or Firm* — Holtz Holtz Goodman & Chick PC

(57) ABSTRACT

Disclosed is an image display apparatus including: a display section; a theme icon storage section which stores a plurality of sets of a theme of an image corresponded to a theme icon representing the theme; an image storage section which stores an image folder storing a sequence of a plurality of images; an image theme detecting section which detects an image theme of each image; a representative theme extracting section which extracts an image theme which represents an image line of the divided sequence of the plurality of images as an image line representative theme for each image line; and a folder icon display control section which positions each theme icon corresponding to the plurality of image line representative themes extracted by the representative theme extracting section according to an order of the image line to form a folder icon and allows the display section to display the folder icon.

9 Claims, 18 Drawing Sheets

FIG.4
153
| THEME NAME | ICON | POSITION | TYPICAL IMAGE | |
|---|---|---|---|---|
| SHANGHAI CRAB |  | CENTER |  |  |
| FISH |  | BOTTOM CENTER |  |  |
| ... | ... | | ... | |
| ISLAND |  | TOP CENTER | 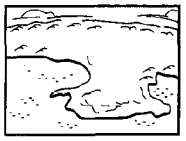 | 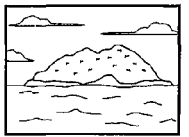 |
| ... | ... | | ... | |
| BUS |  | BOTTOM CENTER | 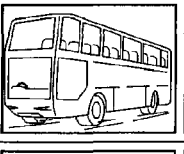 |  |
| SHIP |  | BOTTOM CENTER |  |  |
| LAKE |  | BOTTOM | 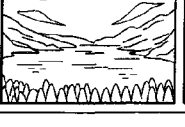 |  |
| SUN |  | TOP | ... | |
| BRIDGE |  | BOTTOM | ... | |

FIG.5
| | 1 | 2 | 3 | 4 | 5 | 6 | 7 |
|---|---|---|---|---|---|---|---|
| |  |  |  | 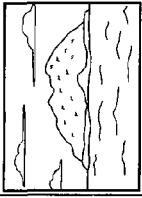 | 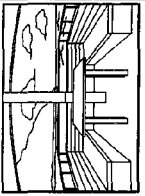 |  |  |
| IMAGE THEME NAME 1 | SHIP | SHIP | ISLAND | SIGHTSEEING | ISLAND | SEA | SEA |
| IMAGE THEME NAME 2 | PORT | INSIDE SHIP | SEA | MOUNTAIN CLIMBING | MOUNTAIN CLIMBING | FISH | UNDERSEA |
| IMAGE THEME NAME 3 | BOAT | | ROCK | | SIGHTSEEING | DIVING | GROUP OF FISH |
| IMAGE LINE REPRESENTATIVE THEME | SHIP | SHIP | ISLAND | ISLAND | ISLAND | FISH | FISH |
| THEME MATCH | ○ | ○ | ○ | × | ○ | ○ | ○ |

FIG.6

| | 1 | 2 | 3 | 4 | 5 |
|---|---|---|---|---|---|
| IMAGE THEME NAME 1 | BUS | SHOP | ROUND TABLE | SHANGHAI CRAB | SHANGHAI CRAB |
| IMAGE THEME NAME 2 | INSIDE VEHICLE | BUS | MEAL | ROUND TABLE | BASKET |
| IMAGE THEME NAME 3 | GUIDE | COUPLE | CUSTOMER | GIRLS | TABLE |
| IMAGE LINE REPRESENTATIVE THEME | BUS | BUS | SHANGHAI CRAB | SHANGHAI CRAB | SHANGHAI CRAB |
| THEME MATCH | ○ | ○ | × | ○ | ○ |

| | 6 | 7 | 8 | 9 | 10 |
|---|---|---|---|---|---|
| IMAGE THEME NAME 1 | LAKE | SHANGHAI CRAB | SHANGHAI CRAB | CONTAINER | SHANGHAI CRAB |
| IMAGE THEME NAME 2 | LAKESIDE | FISH PRESERVE | FISHERMAN | HAND | FOAM |
| IMAGE THEME NAME 3 | PERSON | LAKE | LAKE | | |
| IMAGE LINE REPRESENTATIVE THEME | LAKE | LAKE | LAKE | LAKE | LAKE |
| THEME MATCH | ○ | ○ | ○ | × | ○ |

154(154N)

FIG.18
| THEME NAME | ICON | KEYWORD |
|---|---|---|
| SHANGHAI CRAB | 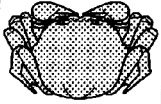 | SHANGHAI CRAB, SHANGHAI SHRIMP, RESTAURANT ... |
| FISH |  | FISH, FISHING, AQUARIUM ... |
| ... | ... | ... |
| ISLAND |  | ISLAND, REMOTE ISLAND ... |
| ... | ... | ... |
| BUS |  | SIGHTSEEING BUS, INSIDE BUS, BUS GUIDE, VIEW FROM BUS WINDOW ... |
| SHIP | 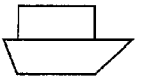 | SHIP, SIGHTSEEING BOAT, INSIDE SHIP ... |
| LAKE | 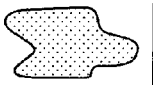 | LAKE, YANGCHENG LAKE ... |
| SUN |  | ... |
| BRIDGE | 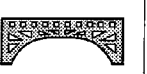 | ... |
153

IMAGE DISPLAY APPARATUS, IMAGE DISPLAY METHOD AND RECORDING MEDIUM RECORDING AN IMAGE DISPLAY PROGRAM

BACKGROUND OF THE INVENTION

1. Field of the Invention

The present invention relates to an image display apparatus, image display method and recording medium recording an image display program.

2. Description of the Related Art

Conventionally, in an image display apparatus which imports a plurality of pieces of image data and displays the image, when a plurality of images are displayed at once it is possible to classify and display the images by theme. Specifically, in one technique, theme marks representing various themes are prepared. When a sequence of images are displayed arranged in order of shooting, etc., the sequence of images are divided in a line of images by theme and the theme mark corresponding to the theme of the image line is displayed first in each image line. In another technique, a plurality of images are classified by theme and displayed in a tree form.

However, according to the conventional techniques, the theme mark needs to be followed by sight, or classification by the tree needs to be followed to the tip in order to understand the course of change of the themes in the sequence of images in the image folder.

SUMMARY OF THE INVENTION

The present invention has been made in consideration of the above situation, and one of the main objects is to provide an image display apparatus and program with which a course of change of themes in a sequence of images can be understood at one glance.

In order to achieve any one of the above advantages, according to an aspect of the present invention, there is provided an image display apparatus including:

a display section;

a theme icon storage section which stores a plurality of sets of a theme of an image corresponded to a theme icon representing the theme;

an image storage section which stores an image folder storing a sequence of a plurality of images;

an image theme detecting section which detects an image theme of each image of the sequence of the plurality of images;

a representative theme extracting section which extracts an image theme which represents a content of an image line of the divided sequence of the plurality of images as an image line representative theme for each image line from the image theme detected by the image theme detecting section; and a folder icon display control section which positions each theme icon corresponding to the plurality of image line representative themes extracted by the representative theme extracting section according to an order of the image line in the sequence of the plurality of images to form a folder icon and allows the display section to display the folder icon as the folder icon of the image folder.

According to the present invention, the image theme of each image of the sequence of plurality of images is detected, an image theme which represents the content of the image line is extracted as the image line representative theme for each image line of the divided sequence of plurality of images from the detected image theme, a folder icon is formed by positioning the theme icons corresponding to the extracted plurality of image line representative themes according to the order of the image line, and the formed folder icon is displayed as the folder icon of the image folder. Consequently, the course of change of theme in a sequence of images stored in the image folder can be understood at one glance.

BRIEF DESCRIPTION OF THE DRAWINGS

The present invention and the above-described objects, features and advantages thereof will become more fully understood from the following detailed description with the accompanying drawings and wherein;

FIG. 4 is a diagram showing a data structure of an icon data table;

FIG. 5 is a diagram showing a data structure of an image/theme corresponding table;

FIG. 6 is a diagram showing a data structure of an image/theme corresponding table;

FIG. 18 is a diagram showing a data structure of a modification of an icon data table.

DETAILED DESCRIPTION OF THE PREFERRED EMBODIMENTS

Preferred embodiments for carrying out the present embodiment are described in detail with reference to the attached drawings. However, the scope of the invention not limited to the embodiments and the illustrated examples.

[Configuration]

Figure 1:
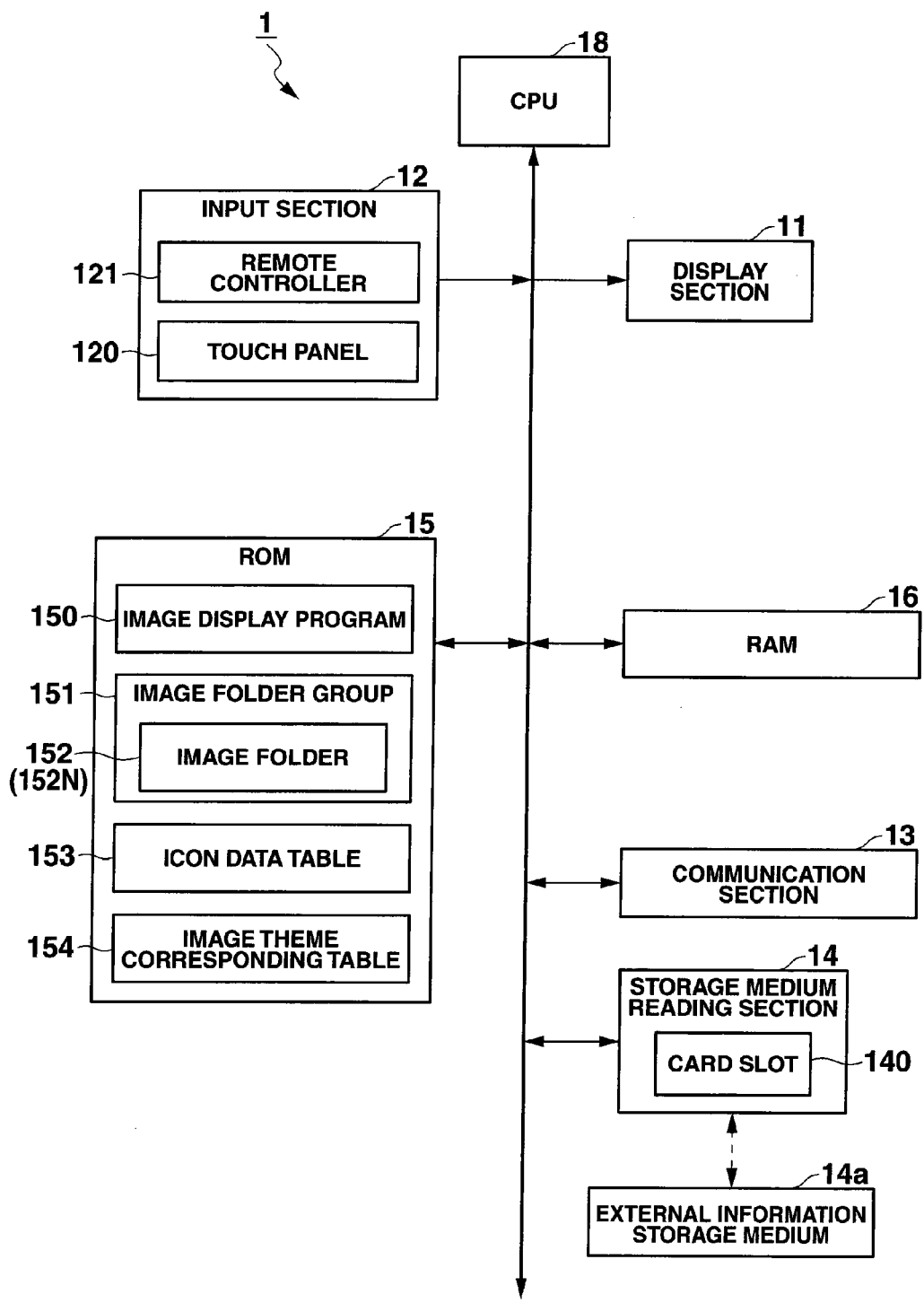
FIG. 1 is a block diagram showing a schematic configuration of an image display apparatus.
Figure 2:
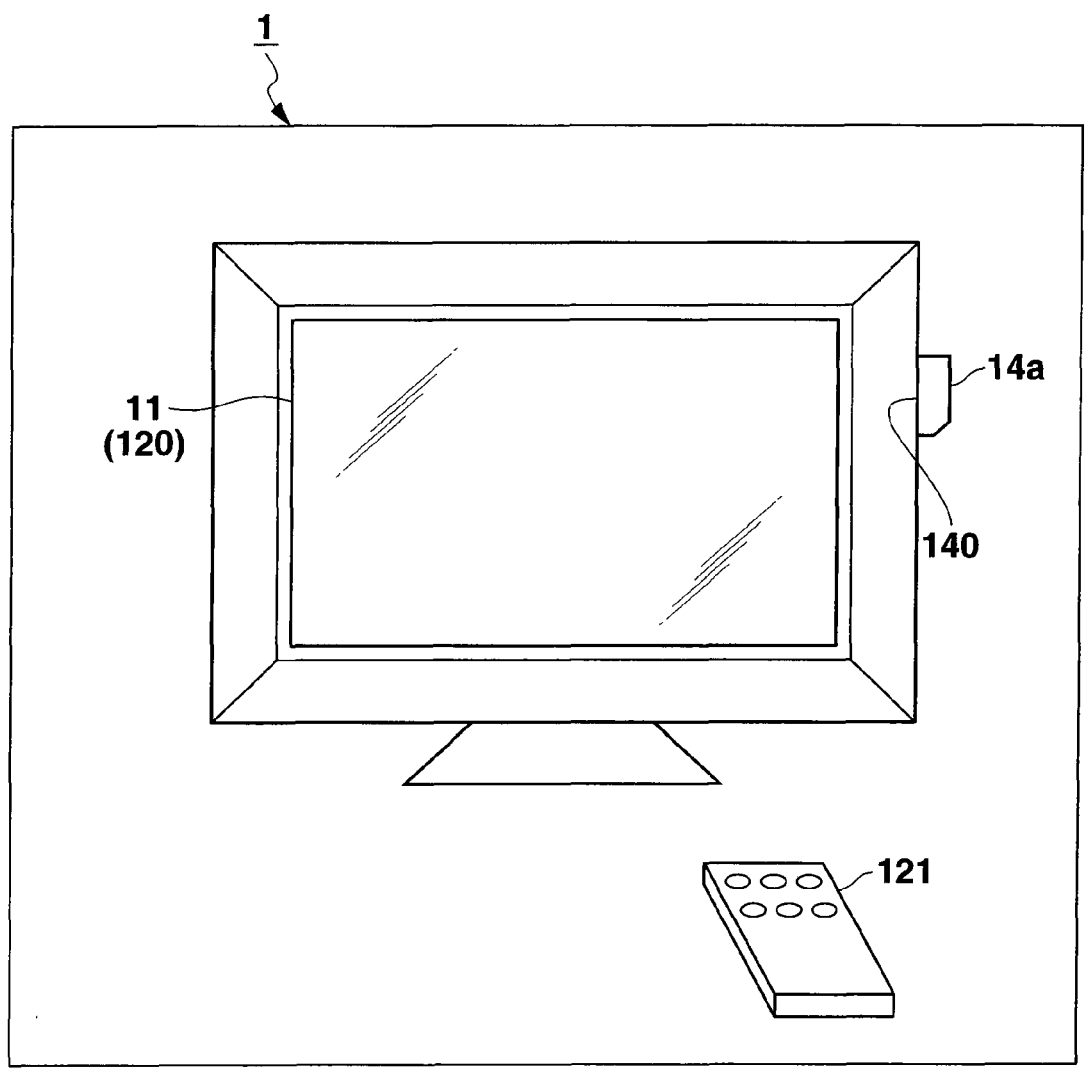
FIG. 2 is a diagram showing a schematic configuration of the image display apparatus.

FIG. 1 is a block diagram showing a schematic configuration of an image display apparatus 1 employing the present invention. As shown in FIG. 2, the image display apparatus 1 of the present embodiment is, for example, a digital photograph frame placed on a desk. The image display apparatus 1 obtains image data from an external device, etc. (for example, a digital camera) and displays an image according to the obtained image data.

Specifically, as shown in FIG. 1, the image display apparatus 1 includes, a display section 11, an input section 12, a communication section 13, a storage medium reading section 14, a ROM 15, a RAM 16, a CPU 18, etc.

The display section 11 includes a liquid crystal display (LCD), organic electroluminescence (EL) display, etc. and displays various information such as a later described folder icon F (see FIG. 10A) of an image folder 152 according to a display signal from the CPU 18. The display of the display section 11 of the present embodiment is provided as one with a touch panel 120 on an entire face of a display screen.

The input section 12 includes the above described touch panel 120 and a remote controller 121, and outputs an operation signal corresponding to user operation to the CPU 18. The remote controller 121 includes, for example, a cursor key to perform selection of an image folder or operation of forwarding an image, an enter key to perform determination operation, a return key to return processing to a state of display directly before, etc.

The communication section 13 performs data communication with other electronic devices such as a personal computer or camera, and in the present embodiment, transmits and receives information in the ROM 15. Moreover, this communication section 50 can connect to the Internet, and with this, can communicate with external devices connected to the Internet. The communication method can be wireless or wired.

The storage medium reading section 14 includes a card slot 140 and reads information from an external information storage medium 14a attached to the card slot 140 and stores information in the external information storage medium 14a. Information in the ROM 15 or the RAM 16 can be recorded in the external information storage medium 14a.

The ROM 15 is a memory which stores a program or data to realize various functions of the image display apparatus 1. In the present embodiment, ROM 15 stores an image display program 150 regarding the present invention, image folder group 151, icon data table 153, image/theme corresponding table 154, etc.

The image display program 150 is a program for allowing the CPU 18 to perform a later described image display processing (see FIG. 7 to FIG. 9).

Figure 3:
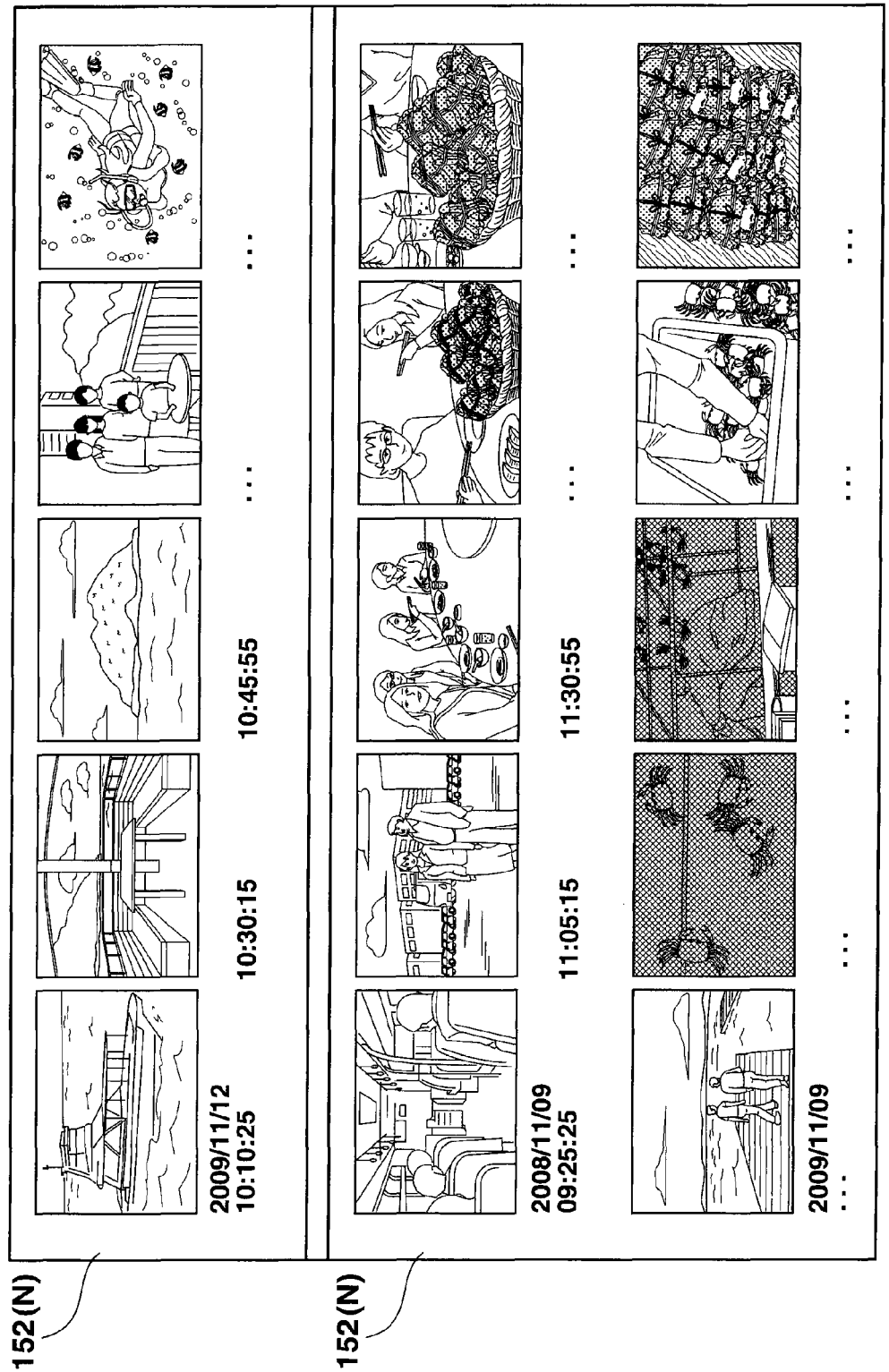
FIG. 3 is a diagram showing a data structure of an image folder.

The image folder group 151 includes a plurality of image folders 152. As shown in FIG. 3, each image folder 152 stores image data of a sequence of a plurality of images. Each piece of image data in the image folder 152 is corresponded to a forming time and date (shooting time and date).

As shown in FIG. 4, the icon data table 153 stores a theme name corresponded to a theme icon I representing the theme regarding a plurality of types of image themes which can be represented by an image. In the present embodiment, the icon data table 153 stores a plurality of types of general images (hereinafter referred to as typical image) TG representing each theme for each theme. The icon data table 153 stores a layout position in a vertical direction when the theme icon I is included in a folder icon F of the image folder 152 for each theme icon I.

The image/theme corresponding table 154 is provided for each image folder 152 and as shown in FIG. 5 and FIG. 6, stores one to three themes of an image corresponded with each image in the image folder 152. The image/theme corresponding table 154 stores an image theme (hereinafter referred to as image line representative theme) which represents a content of an image line L corresponded to each image line L obtained by dividing the stored image. The image/theme corresponding table 154 stores whether or not the image theme of the image and the image line representative theme match corresponded with each image in the image line L.

The RAM 16 includes a memory area which temporarily holds various programs performed by the CPU 18 and data, etc. regarding performing such programs.

The CPU 18 performs processing based on a predetermined program according to an input instruction, performs instruction to each functional section, transfer of data, etc. and generally controls the image display apparatus 1. Specifically, the CPU 18 reads out various programs stored in the ROM 15 according to an operation signal, etc. input from the input section 12 and performs processing according to the program. Then, the CPU 1 stores the processing result in the RAM 16 and suitably outputs the processing result to the display section 11.

[Operation]

Next, the image display processing by the image display apparatus 1 is described with reference to FIG. 7 to FIG. 9.

Figure 7:
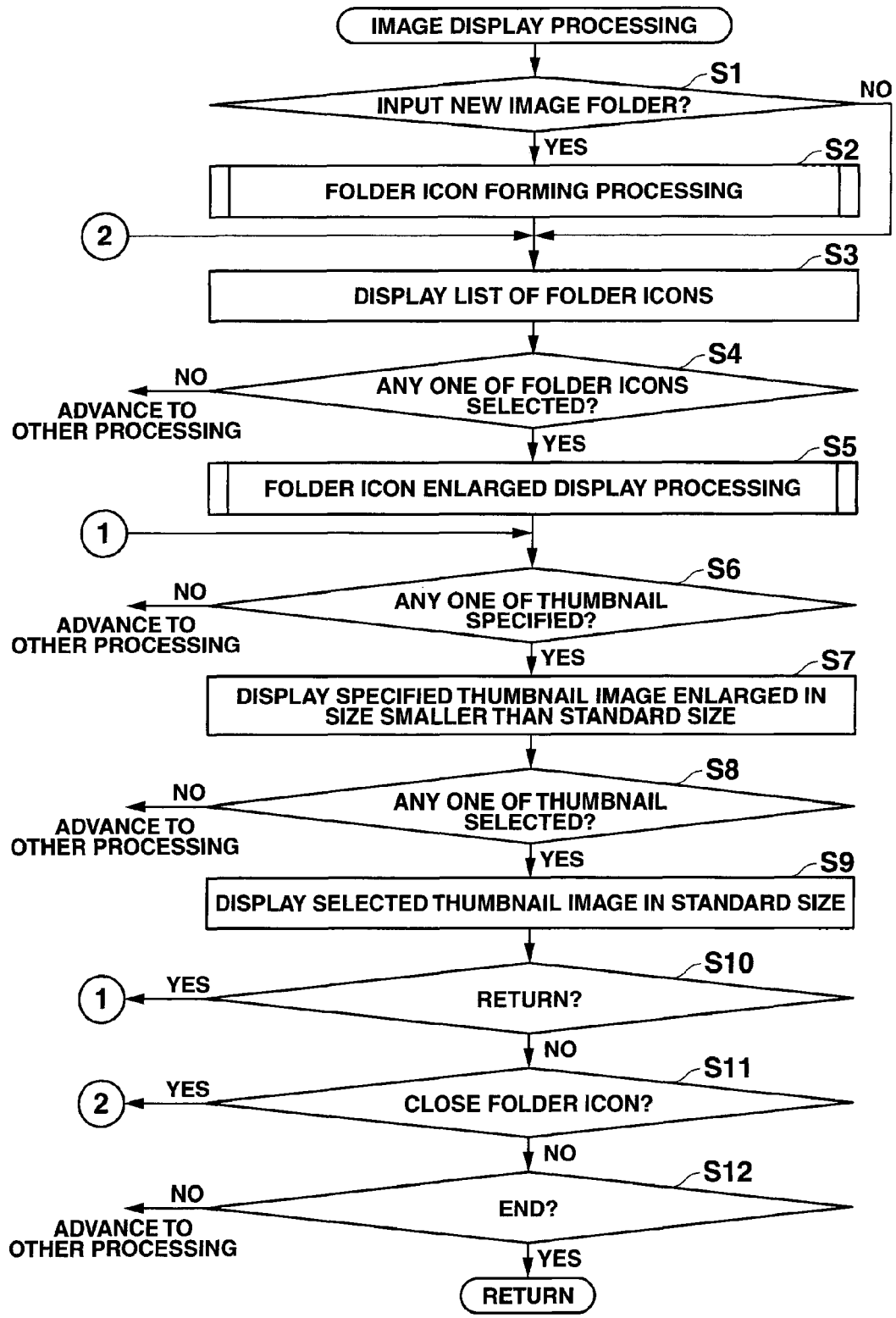
FIG. 7 is a flowchart showing a flow of image display processing.

As shown in FIG. 7, in the image display processing, first the CPU 18 judges whether or not a new image folder 152 (hereinafter referred to as image folder 152N) is input through the communication section 13 (step S1) and when it is judged that it is not input (step S1; No), the processing advances to a later described step S3.

When it is judged that a new image folder 152N is input in step S1 (step S1; Yes), the CPU 18 stores the image folder 152N in the image folder group 151 of the ROM 15 and then performs folder icon forming processing (step S2).

Figure 8:
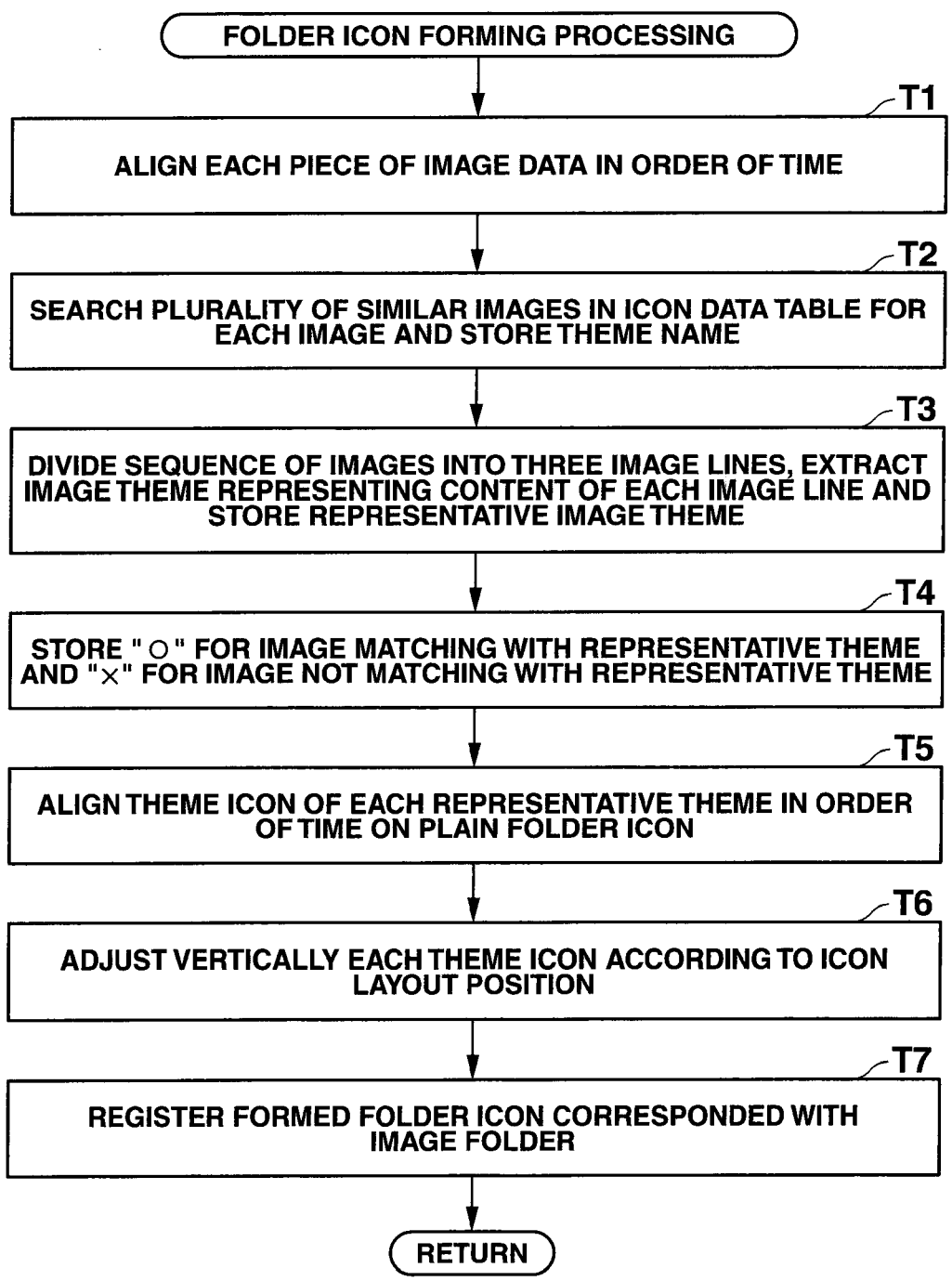
FIG. 8 is a flowchart showing a flow of folder icon forming processing.

Specifically, as shown in FIG. 8, in the folder icon forming processing, first the CPU 18 forms a new image/theme corresponding table 154 (hereinafter referred to as image/theme corresponding table 154N) in which data is not stored for the new input image folder 152N and also sorts each piece of image data in the image folder 152N in an order according to time (in the present embodiment, in an order from image data with an old forming time and date) to store the data in the image/theme corresponding table 154N (step T1).

Next, the CPU 18 specifies each piece of image data in the image folder 152N in order as a processing target, compares the image of the image data of the processing target (hereinafter referred to as an image of the processing target) with each typical image TG in the icon data table 153, searches for a typical image TG similar to the image of the processing target in the icon data table 153, and stores the three types of image themes with the three highest detected number among the image themes of the detected typical images TG as the image theme of the image of the processing target in the image/theme corresponding table 154N (step T2). Conventionally, well known image matching techniques can be used as determining the similarity between the image of the processing target and the typical image TG.

Next, the CPU 18 divides the sequence of images in the image/theme corresponding table 154N into three image lines L, and with respect to each image line L, the CPU 18 an image theme which represents the content of the image line L among the plurality of image themes corresponded to each image in the image theme corresponding table 154N and stores the image theme as the image line representative theme corresponded to the image line L in the image/theme corresponding table 154N (step T3).

Next, the CPU 18 judges whether or not the image theme of each image in each image line L matches with the image line representative theme and "○" showing there is a match or "x" showing there is no match is corresponded to the image and stored in the image/theme corresponding table 154N (step T4).

Next, in order to form the folder icon F of the image folder 152N, first the CPU 18 positions each theme icon I corresponding to the three image line representative themes on a plain folder icon stored in the ROM 15 by default (step T5). Specifically, the CPU 18 positions the three theme icons I aligned from left to right according to the order of the image line L in the image/theme corresponding table 154N (order of image line representative theme). Preferably, the CPU 18 refers to the forming date and time of each piece of image data in each image line L and positions each theme icon I so that the theme icon I of an old image line L is positioned toward the left side and the theme icon I of a new image line L is positioned toward the right side.

Next, the CPU 18 adjusts each theme icon I positioned on the folder icon F based on the layout position in the vertical direction stored in the icon data table 153 of the theme icon I and completes forming the folder icon F (step T6). Preferably, the CPU 18 makes minor adjustments of the position of each theme icon I so that the three theme icons I do not overlap on one another.

Next, the CPU 18 registers the formed folder icon F as the folder icon of the image folder 152N (step T7) and ends the folder icon forming processing.

When the above folder icon forming processing ends, as shown in FIG. 7, next, the CPU 18 displays as a list the folder icon F of each image folder 152 in the image folder group 151 on the image section 11 (step S3).

Next, the CPU 18 judges whether or not the user selected any one of the folder icons F (step S4) and when it is judged that it is not selected (step S4; No), the processing advances to another processing.

When it is judged that any one of the folder icons F is selected in step S4 (step S4; Yes), the CPU 18 performs the enlarged display processing of the folder icon F (step S5).

Figure 9:
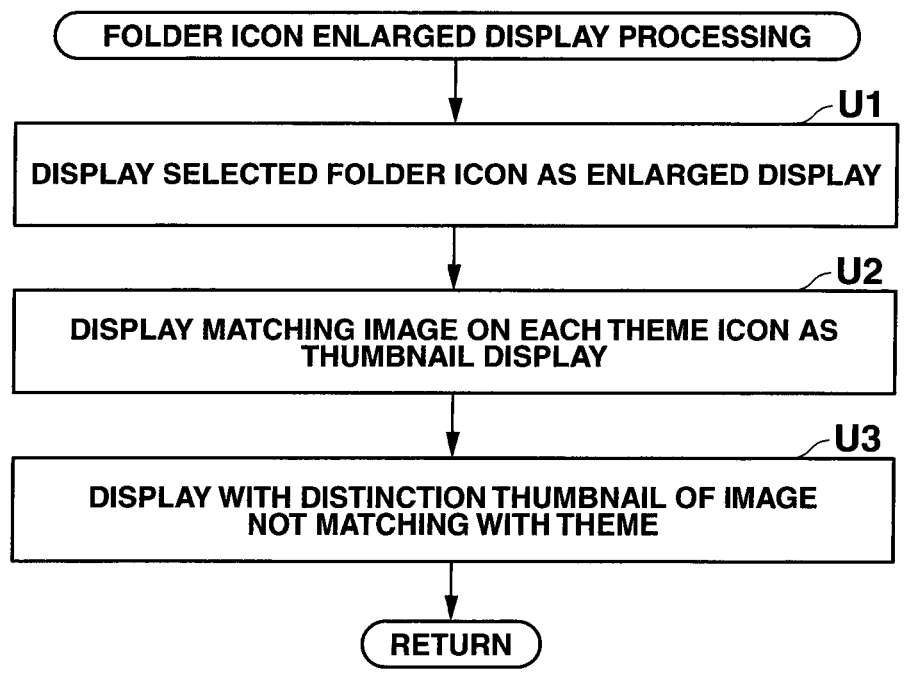
FIG. 9 is a flowchart showing a flow of folder icon enlarged display processing.

Specifically, as shown in FIG. 9, in the enlarged display processing, first the CPU 18 displays an enlarged display of the selected folder icon F (hereinafter referred to as selected folder icon FS) on the display section 11 (step U1). With this, each theme icon I on the selected folder icon FS is displayed with an enlarged display.

Next, the CPU 18 refers to the image/theme corresponding table 154 of the image folder 152 corresponding to the selected folder icon FS, detects the image line L (image line L in which the theme of each theme icon I is the image line representative theme) corresponded with the image line representative theme corresponding to each theme icon I on the selected folder icon FS and displays as a thumbnail display each image in the corresponding image line L on each enlarged theme icon I (step U2). Specifically, here the CPU 18 aligns each image from left to right in the order starting from an image with an old forming time and date and also displays images which have a very close forming time and date aligned vertically. Here, the CPU 18 also adjusts the size of each thumbnail image so that all images in the image line L are displayed at once on the theme icon I.

Next, among each thumbnail image displayed on the theme icon I, the CPU 18 displays with distinction the image stored as not matching with the image line representative theme in the image/theme corresponding table 154 (step U3) and the enlarged display processing ends. The present embodiment is described as the CPU 18 displaying with distinction the thumbnail image which does not match the image line representative theme by applying a "x" mark to the thumbnail image in step U3, however, other methods of displaying with distinction can be employed, such as surrounding with a certain color, etc.

When the above enlarged display processing of the folder icon ends, as shown in FIG. 7, next the CPU 18 judges whether or not any one of the thumbnail images on the selected folder icon FS displayed enlarged is specified by user operation (step S6), and when it is judged that it is not specified (step S6; No), the processing advances to another processing. In the present embodiment, for example the thumbnail image can be specified with operation by touch.

When it is judged that any one of the thumbnail images is specified in step S6 (step S6; Yes), the CPU 18 displays the specified thumbnail image as an enlarged display in a position which does not overlap with the other thumbnail image (step S7). In step S7, the CPU 18 displays the thumbnail image smaller than a standard size (in the present embodiment, a size where the image is displayed fully on the screen).

Next, the CPU 18 judges whether or not any one of the thumbnail images on the selected folder icon FS displayed enlarged is selected by user operation (step S8), and when it is judged that it is not selected (step S8; No), the processing advances to another processing. In the present embodiment, for example, the thumbnail image can be selected by double tapping operation.

When it is judged that any one of the thumbnail images is selected in step S8 (step S8; Yes), the CPU 18 enlarges the selected thumbnail image to a standard size (in the present embodiment, a size where the image is displayed fully on the screen) and displays the image (step S9).

Next, the CPU 18 judges whether or not an operation to return the processing to a state of display directly before is performed (step S10), and when it is judged that it is performed (step S10; Yes), the processing returns to the above described step S6.

When it is judged that the operation to return is not performed in step S10 (step S10; No), the CPU 18 judges whether or not operation to close the selected folder icon FS is performed (step S11) and when it is judged that it is performed (step S11; Yes), the processing returns to the above described step S3.

When it is judged that the operation to close the selected folder icon FS is not performed in step S11 (step S11; No), the CPU 18 judges whether or not end operation is performed (step S12).

When it is judged that the end operation is not performed in step S12 (step S12; No) the CPU 18 advances another processing and when it is judged that the end operation is performed (step S12; Yes), the image display processing ends.
(Example of Operation of Image Display Processing)

Next, the image display processing is specifically described with reference to FIG. 10A to FIG. 17B.

Operation Example (1)

First, when the image folder 152, shown in the upper side of FIG. 3, is input (step S1; Yes), as shown in FIG. 5, a new image/theme corresponding table 154 is formed, each piece of image data in the image folder 152 is sorted in order from the data with the forming date and time which is old, and is stored in the image/theme corresponding table 154 (step T1).

Next, each piece of image data in the image folder 152 is specified as the processing target in order, the image of the processing target is compared with each typical image TG in the icon data table 153, the typical image TG similar to the image of the processing target searched from the icon data table 153, and among the image themes of each detected typical image TG, the three types of image themes with the three highest detected number are stored as the image theme of the image of the processing target in the image/theme corresponding table 154N (step T2).

Next, the sequence of images in the image/theme corresponding table 154N is divided into three image lines L, image themes which represent the content of the image line L, here themes "ship", "island", "fish", are extracted from the plurality of image themes corresponded to each image in the image/theme corresponding table 154N for each image line L and the extracted image themes are stored in the image/theme corresponding table 154N corresponded with the image line L as image line representative themes (step T3).

Next, it is judged whether or not the image theme of each image in each image line L matches with the image line representative theme, and "○" showing there is a match or "x" showing there is no match are stored corresponded to the image in the image/theme corresponding table 154N (step T4).

Figure 10A:
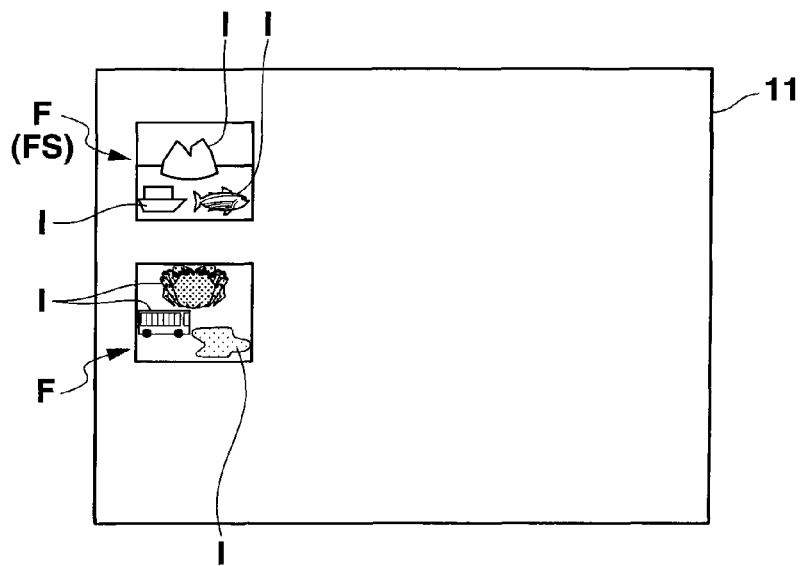
FIG. 10A to FIG. 10C are diagrams showing a display content of a display section.

Next, as shown in the top left portion of FIG. 10A, the theme icons I corresponding to the three image line representative themes "ship", "island", "fish" are positioned to be aligned from left to right on the plain folder icon (step T5). Each theme icon I is adjusted up and down based on the layout position in the vertical direction stored in the icon data table 153 and the forming of the folder icon F ends (step T6). The folder icon F is displayed on the display section 11 (step S3).

Similarly, when the image folder 152 shown in the lower side of FIG. 3 is input (step S1; Yes), after forming the image/theme corresponding table 154 as shown in FIG. 6, as shown in the top left portion of FIG. 10A, the folder icon F in which the theme icons I corresponding to the three image line representative themes "bus", "shanghai crab", "lake" are positioned is formed (step T6) and displayed on the display section 11 (step S3).

Next, when the user selects the folder icon F in the upper side of FIG. 10A (step S4; Yes), as shown in FIG. 10E, the selected folder icon FS is displayed enlarged (step U1). With this, each theme icon I on the selected folder icon FS is displayed enlarged.

Next, the image/theme corresponding table 154 (image/theme corresponding table shown in FIG. 5) regarding image folder 152 (image folder in the upper side of FIG. 3) corresponding to the selected folder icon FS is referred, the image line L corresponding to each theme icon I ("ship", "island", "fish") on the selected folder icon FS is detected, and the images in the corresponding image line L are displayed as a thumbnail display on the enlarged theme icons I (step U2). Among the thumbnail images displayed on the theme icons I, the image which is stored as not matching with the image line representative theme in the image/theme corresponding table 154 is and displayed distinguished with a "x" mark (step U3). The illustration of some of the thumbnail images are simplified in FIG. 10B and the later described FIG. 11A, etc.

Figure 10B:
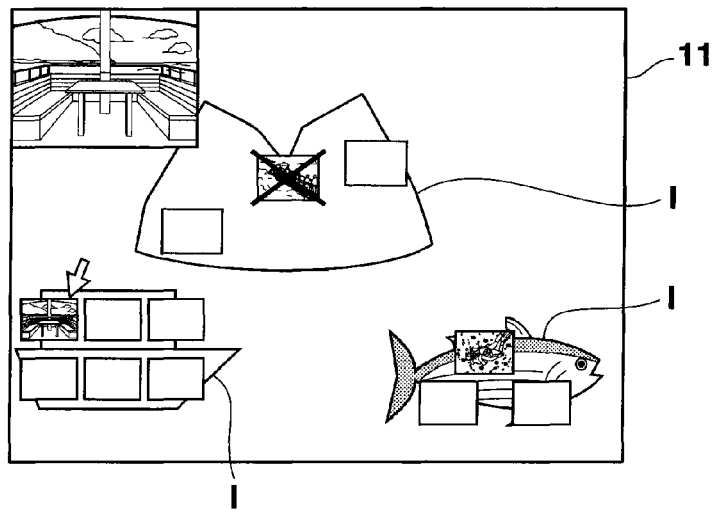

Next, when the user specifies the thumbnail image shown by an arrow in FIG. 10B by touch operation (step S6; Yes), as shown in the top left portion of FIG. 10E, the specified thumbnail image is displayed enlarged in a position which does not overlap with the other thumbnail image (step S7).

Figure 10C:
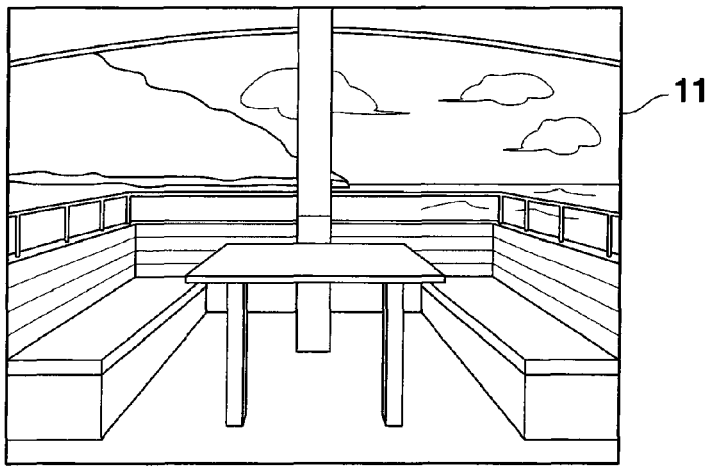

Next, when the user selects the thumbnail image shown with the arrow in FIG. 10B by double tap operation (step S8), as shown in FIG. 10C, the selected thumbnail image is displayed fully on the screen (step S9).

Figure 11A:
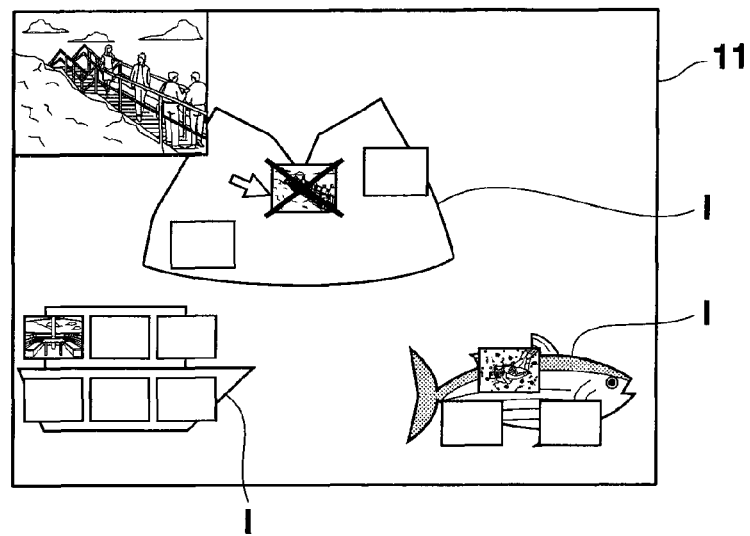
FIG. 11A to FIG. 11B are diagrams showing a display content of a display section.
Figure 11B:
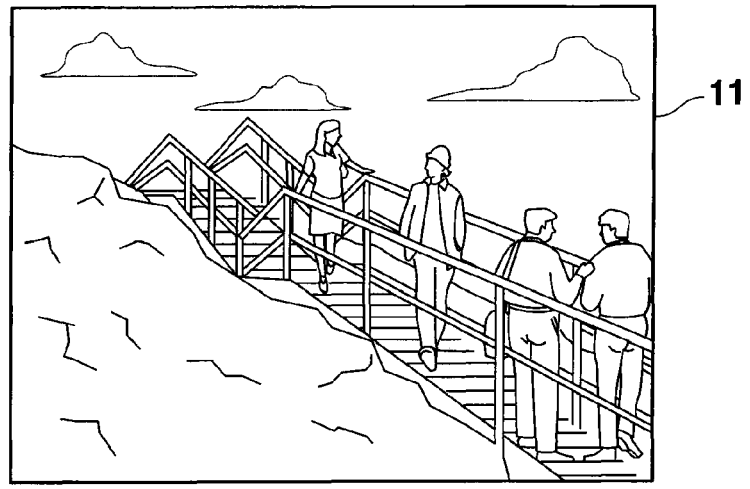

Next, after the user performs the return operation (step S10; Yes), when the user specifies the thumbnail image shown by an arrow in FIG. 11A by touch operation (step S6; Yes), as shown in the top left portion of the diagram, the specified thumbnail image is displayed enlarged in a position which does not overlap with the other thumbnail image (step S7). Then, when the user selects the same thumbnail image by double tap operation (step S8), as shown in FIG. 11B, the selected thumbnail image is displayed fully on the screen (step S9).

Figure 12A:
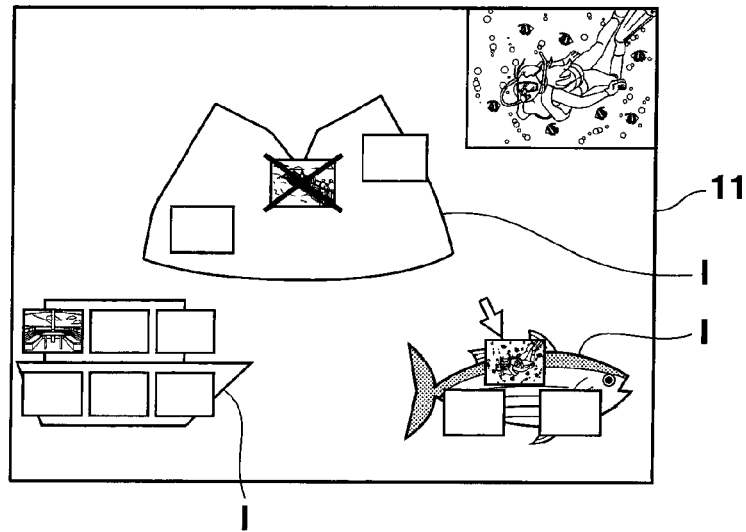
FIG. 12A to FIG. 12B are diagrams showing a display content of a display section.
Figure 12B:
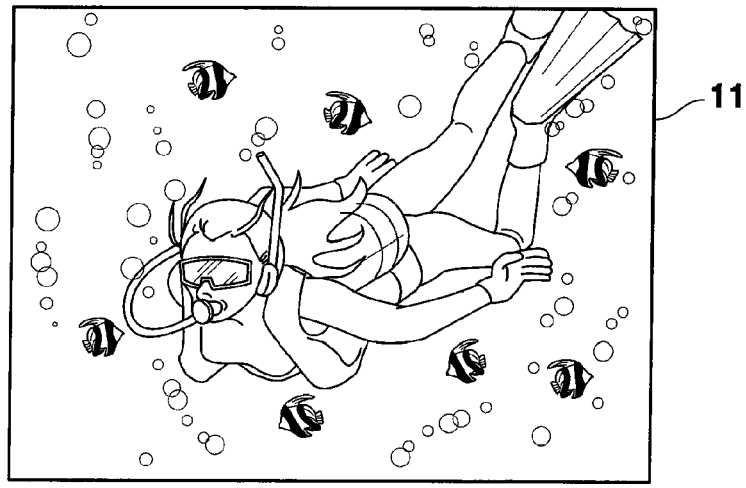

Next, after the user performs the return operation (step S10; Yes), when the user specifies the thumbnail image shown by an arrow in FIG. 12A by touch operation (step S6; Yes), as shown in the top right portion of the diagram, the specified thumbnail image is displayed enlarged in a position which does not overlap with the other thumbnail image (step S7). Then, when the user selects the same thumbnail image by double tap operation (step S8), as shown in FIG. 12B, the selected thumbnail image is displayed fully on the screen (step S9).

Next, when the user performs operation of closing the selected folder icon FS (step S11; Yes), as shown in FIG. 13A, the folder icons F of each image folder 152 are displayed as a list, on the display section 11 (step S3).

Figure 13A:
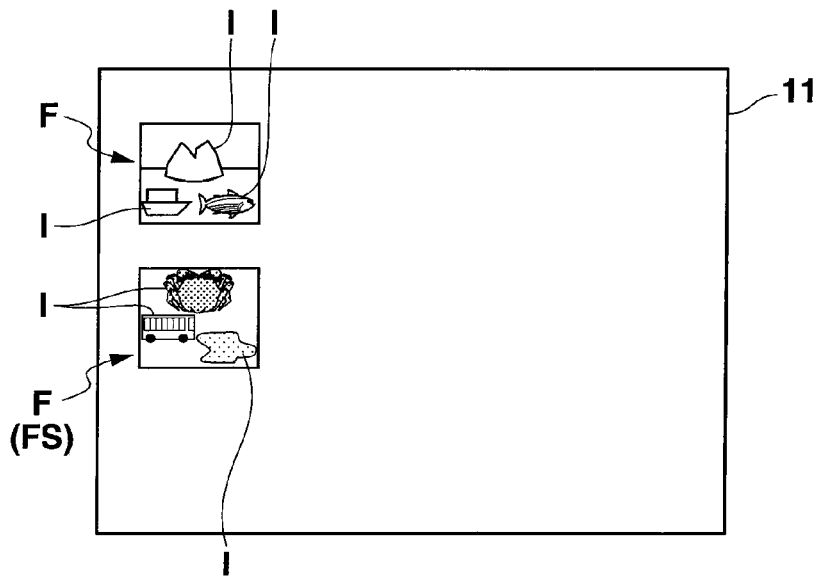
FIG. 13A to FIG. 13C are diagrams showing a display content of a display section.
Figure 13B:
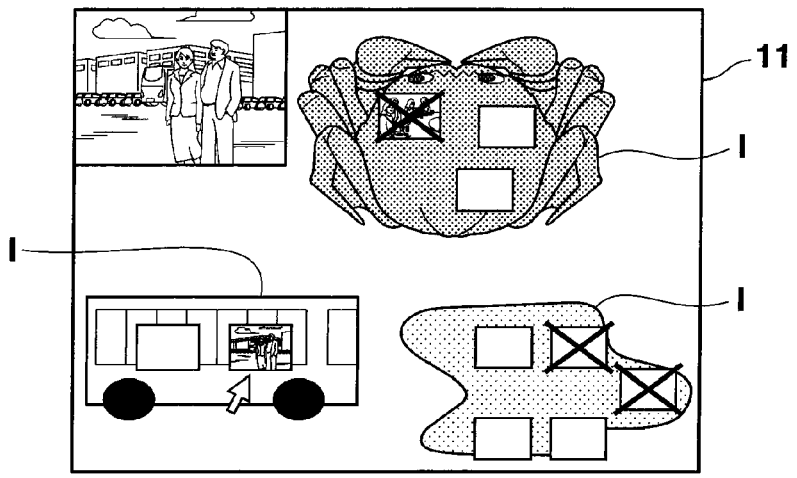

Next, when the user selects the folder icon F in the lower side of FIG. 13A (step S4; yes), as shown in FIG. 13B, the selected folder icon FS is displayed enlarged (step U1). With this, the theme icons are displayed enlarged on the selected folder icon FS.

Next, the image/theme corresponding table 154 (image/theme corresponding table shown in FIG. 6) regarding image folder 152 (image folder in the lower side of FIG. 3) corresponding to the selected folder icon FS is referred, the image line L corresponding to each theme icon I ("bus", "shanghai crab", "lake") on the selected folder icon FS is detected, and the images in the corresponding image line L are displayed as a thumbnail display on the enlarged theme icons I (step U2). Among the thumbnail images displayed on the theme icons I, the image which is stored as not matching with the image line representative theme in the image/theme corresponding table 154 is displayed distinguished with a "x" mark (step U3).

Figure 13C:
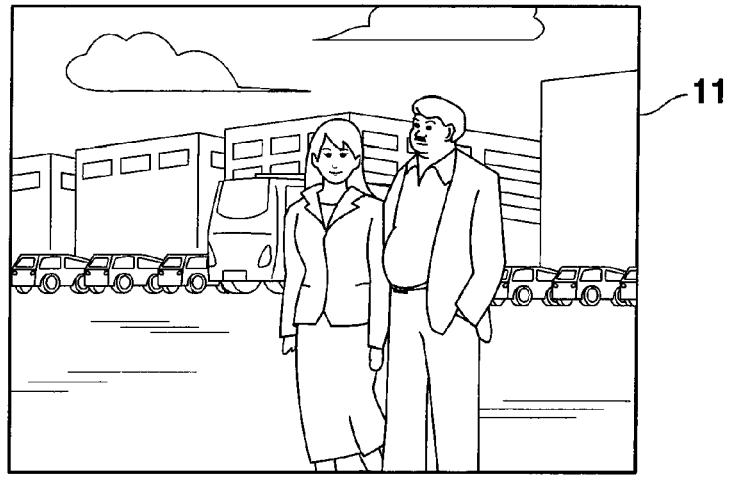

Next, when the thumbnail image shown by an arrow in FIG. 1B is specified by touch operation by the user (step S6; Yes), as shown in the top left portion of FIG. 13B, the specified thumbnail image is displayed enlarged in a position which does not overlap with the other thumbnail image (step S7). Next, when the user selects the same thumbnail image by double tap operation (step S8), as shown in FIG. 13C, the selected thumbnail image is displayed fully on the screen (step S9).

Figure 14A:
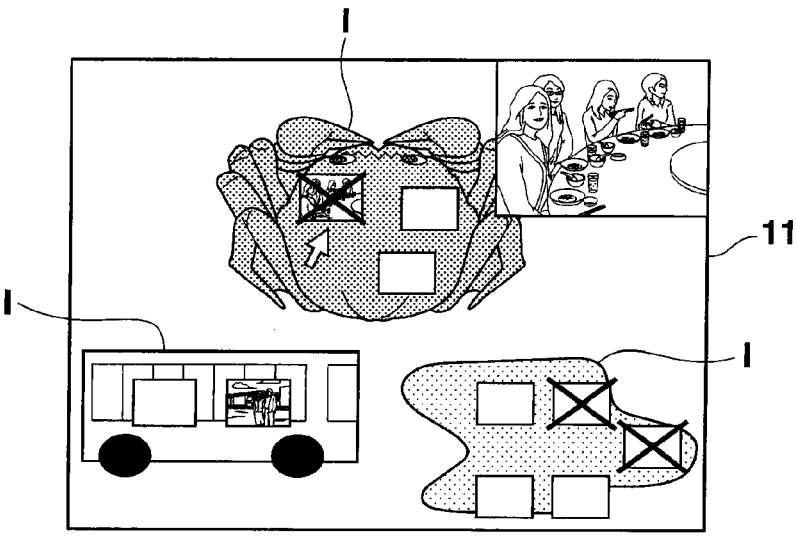
FIG. 14A to FIG. 14B are diagrams showing a display content of a display section.
Figure 14B:

Next, after the user performs the return operation (step 10; Yes), when the user specifies the thumbnail image shown by an arrow in FIG. 14A by touch operation (step S6; Yes), as shown in the top right portion of the diagram, the specified thumbnail image is displayed enlarged in a position which does not overlap with the other thumbnail image (step S7). Then, when the user selects the same thumbnail image by double tap operation (step S8), as shown in FIG. 14B, the selected thumbnail image is displayed fully on the screen (step S9).

Figure 15A:
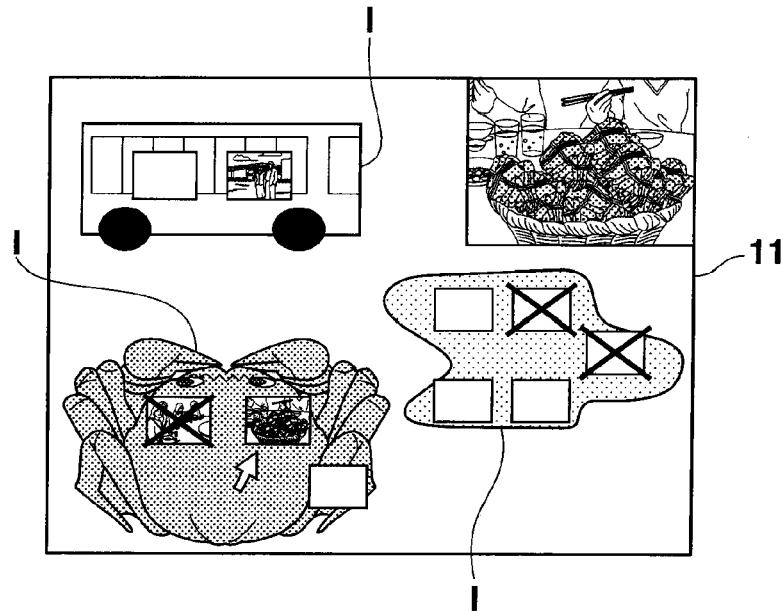
FIG. 15A to FIG. 15B are diagrams showing a display content of a display section.
Figure 15B:

Next, after the user performs the return operation (step S10; Yes), when the user specifies the thumbnail image shown by an arrow in FIG. 15A by touch operation (step S6; Yes), as shown in the top right portion of the diagram, the specified thumbnail image is displayed enlarged in a position which does not overlap with the other thumbnail image (step S7). Then, when the user selects the same thumbnail image by double tap operation (step S8), as shown in FIG. 15B, the selected thumbnail image is displayed fully on the screen (step S9).

Figure 16A:
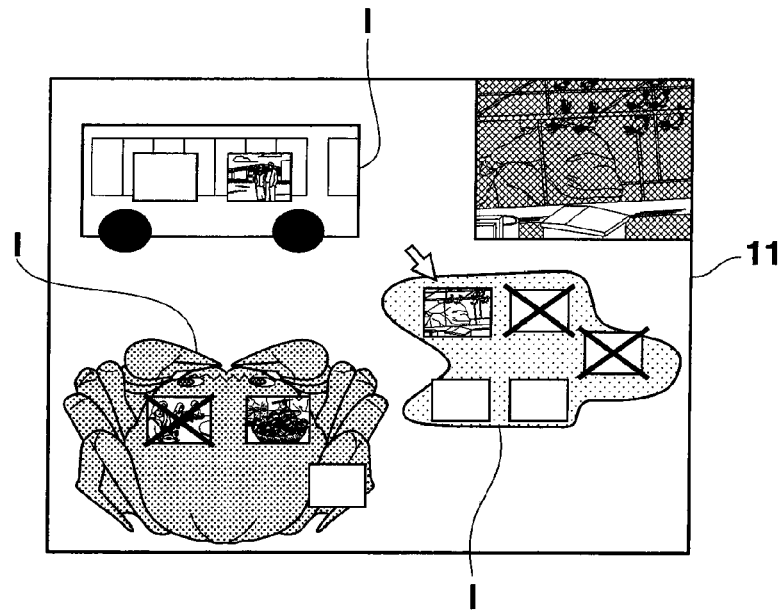
FIG. 16A to FIG. 16B are diagrams showing a display content of a display section.
Figure 16B:

Next, after the user performs the return operation (step S10; Yes), when the user specifies the thumbnail image shown by an arrow in FIG. 16A by touch operation (step S6; Yes), as shown in the top right portion of the diagram, the specified thumbnail image is displayed enlarged in a position which does not overlap with the other thumbnail image (step S7). Then, when the user selects the same thumbnail image by double tap operation (step S8), as shown in FIG. 16B, the selected thumbnail image is displayed fully on the screen (step S9).

Figure 17A:
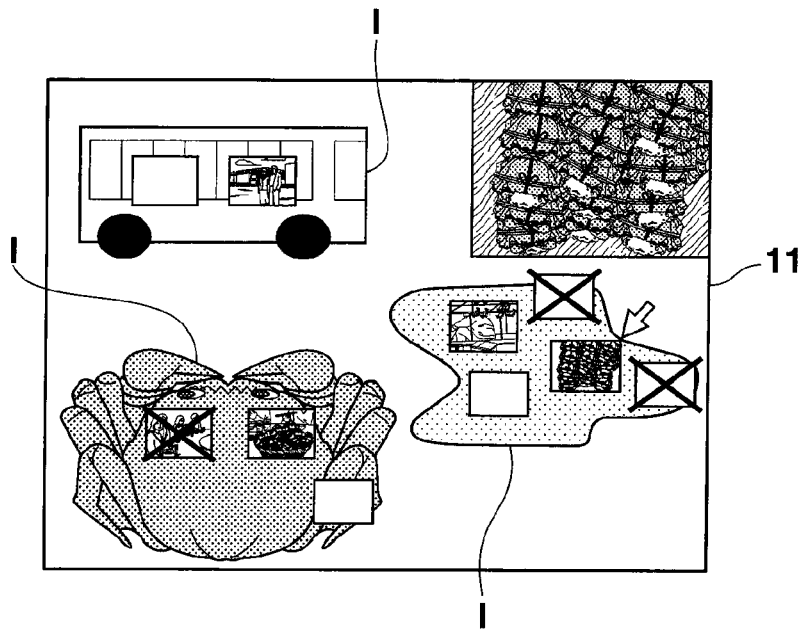
FIG. 17A to FIG. 17B are diagrams showing a display content of a display section.
Figure 17B:
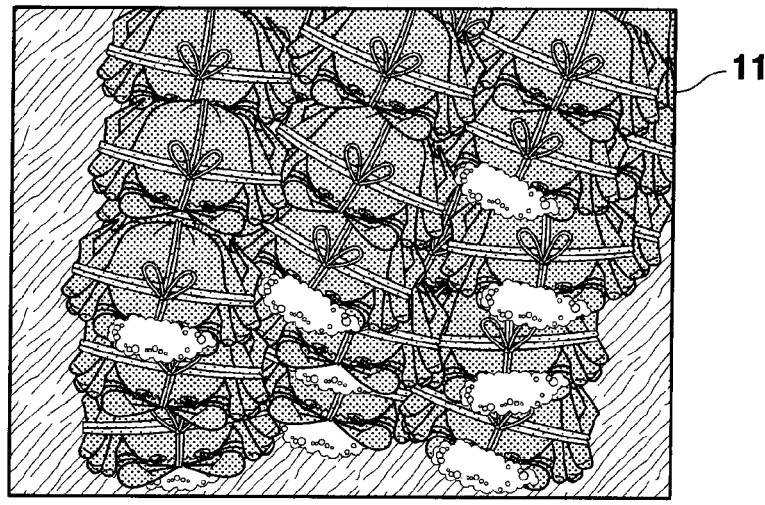

Next, after the user performs the return operation (step S10; Yes), when the user specifies the thumbnail image shown by an arrow in FIG. 17A by touch operation (step S6; Yes), as shown in the top right portion of the diagram, the specified thumbnail image is displayed enlarged in a position which does not overlap with the other thumbnail image (step S7). Then, when the user selects the same thumbnail image by double tap operation (step S8), as shown in FIG. 17B, the selected thumbnail image is displayed fully on the screen (step S9).

As described above, according to the image display apparatus 1 of the present embodiment, as shown in FIG. 5, FIG. 6, FIG. 8 FIG. 10A to FIG. 17B, etc., the image theme of each image of the sequence of plurality of images is detected, an image theme which represents the content of the image line L is extracted as the image line representative theme for each image line. L of the divided sequence of plurality of images from the detected image theme, a folder icon F is formed by positioning the theme icons I corresponding to the extracted plurality of image line representative themes according to the order of the image line L, and the formed folder icon F is displayed as the folder icon F of the image folder 152. Consequently, the course of change of theme in a sequence of images stored in the image folder 152 can be understood at one glance.

As shown in steps U1 to U2 in FIG. 9, FIG. 10B, etc., the folder icon F is displayed enlarged based on user operation on the folder icon F, and on each theme icon I included in the folder icon F, each image of the image line L corresponded to the image line representative theme is displayed as a thumbnail display on each theme icon I which the image line representative theme corresponds to. Consequently, the content of the image stored in the image folder 152 can be easily understood.

As shown in step U2 in FIG. 9, FIG. 10B, etc., the size of each thumbnail image is adjusted so that all of the images of the image line L corresponded to the image line representative theme corresponding to the theme icon. I are displayed on the respective theme icon I. Consequently, the content of the image stored in the image folder 152 can be securely understood.

Needless to say, the specific configuration and operation of each component of the configuration of the image display apparatus 1 of the present embodiment can be suitably modified, without leaving the scope of the present invention.

For example, the image display apparatus of the present invention is described as a photograph frame, etc. in the above embodiment. However, the product in which the present invention can be employed is not limited to such product, and can be generally employed in electronic devices such as a cellular phone, a personal computer, a PDA (Personal Digital Assistant), game devices, etc. The image display program 150 of the present invention can be stored in a memory card CD, etc. which can be attached and detached to and from the image display apparatus 1.

It is described that the icon data table 153 stores the theme name, the theme icon I and the typical image TG, corresponded to each other, however, as shown in FIG. 18, the theme name, the theme icon I and the keyword relating to the theme name can be stored corresponded to each other. In this case, in the above described step T2, the CPU 18 can search the image on the Internet using each keyword, and the detected image can be used as the typical image TG.

The entire disclosure of Japanese Patent Application No. 2010-207434 filed on Sep. 16, 2010 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image display apparatus comprising:
   a display section;
   a theme icon storage section which stores a plurality of sets of a theme of an image corresponded to a theme icon representing the theme;
   an image storage section which stores an image folder storing a sequence of a plurality of images;
   an image theme detecting section which detects an image theme of each image of the sequence of the plurality of images;
   a folder icon display control section which positions the theme icon corresponding to the image theme detected by the image theme detecting section to form a folder icon, and which controls the display section to display the folder icon as the folder icon of the image folder; and
   a thumbnail display control section which controls the display section to display as an enlarged display the folder icon according to a user operation on the folder icon, and which controls the display section to display the image from which the image theme corresponding to the theme icon is detected as a thumbnail display on the theme icon included in the folder icon.

2. The image display apparatus according to claim 1, wherein the thumbnail display control section adjusts a size of each thumbnail image so that all images corresponding to the theme icon are displayed on the respective theme icon.

3. The image display apparatus according to claim 1, further comprising:
   a representative theme extracting section which extracts an image theme which represents a content of an image line of the divided sequence of the plurality of images as an image line representative theme for each image line from the image theme detected by the image theme detecting section; and
   an image line/theme storage section which stores each image included in the image line corresponded with the image line representative theme regarding the image line;
   wherein, the folder icon display control section positions each theme icon corresponding to the plurality of image line representative themes extracted by the representative theme extracting section according to an order of the image line in the sequence of the plurality of images to form the folder icon, and controls the display section to display the folder icon as the folder icon of the image folder; and
   wherein the thumbnail display control section controls the display section to display as the enlarged display the folder icon according to the user operation on the folder icon, and controls the display section to display each image of the image line corresponded to the image line representative theme as the thumbnail display on each theme icon which the image line representative theme corresponds to, and wherein each theme icon is included in the folder icon.

4. An image display apparatus comprising:
a display section;
a theme icon storage section which stores a plurality of sets of a theme of an image corresponded to a theme icon representing the theme;
an image storage section which stores an image folder storing a sequence of a plurality of images;
an image theme detecting section which detects an image theme of each image of the sequence of the plurality of images; and
a folder icon display control section which aligns each theme icon corresponding to the image theme detected by the image theme detecting section from left to right according to an order of an image line in the sequence of the plurality of images to form the folder icon, and which controls the display section to display the folder icon as the folder icon of the image folder.

5. The image display apparatus according to claim 4, further comprising:
a representative theme extracting section which extracts an image theme which represents a content of an image line of the divided sequence of the plurality of images as an image line representative theme for each image line from the image theme detected by the image theme detecting section;
wherein the folder icon display control section aligns each theme icon corresponding to the plurality of the image line representative themes extracted by the representative theme extracting section from left to right according to the order of the image line in the sequence of the plurality of images and forms the folder icon.

6. An image display method of an image display apparatus including a display section and a storage section, the image display method comprising:
storing a plurality of sets of a theme of an image corresponded to a theme icon representing the theme in the storage section;
storing an image folder storing a sequence of a plurality of images in the storage section;
detecting an image theme of each image of the sequence of the plurality of images;
controlling the theme icon corresponding to the image theme detected by the image theme detecting section to be positioned to form a folder icon, and controlling the display section to display the folder icon as the folder icon of the image folder; and
controlling the display section to display as an enlarged display the folder icon according to user operation on the folder icon, and controlling the display section to display the image from which the image theme corresponding to the theme icon is detected as a thumbnail display on the theme icon included in the folder icon.

7. A non-transitory computer-readable recording medium having recorded thereon an image display program for controlling a computer of an image display apparatus including a display section and a storage section to perform functions comprising:
storing a plurality of sets of a theme of an image corresponded to a theme icon representing the theme in the storage section;
storing an image folder storing a sequence of a plurality of images in the storage section;
detecting an image theme of each image of the sequence of the plurality of images;
controlling the theme icon corresponding to the image theme detected by the image theme detecting section to be positioned to form a folder icon, and controlling the display section to display the folder icon as the folder icon of the image folder; and
controlling the display section to display as an enlarged display the folder icon according to user operation on the folder icon, and controlling the display section to display the image from which the image theme corresponding to the theme icon is detected as a thumbnail display on the theme icon included in the folder icon.

8. An image display method of an image display apparatus including a display section and a storage section, the image display method comprising:
storing a plurality of sets of a theme of an image corresponded to a theme icon representing the theme in the storage section;
storing an image folder storing a sequence of a plurality of images in the storage section;
detecting an image theme of each image of the sequence of the plurality of images; and
controlling each theme icon corresponding to the image theme detected by the image theme detecting section to be aligned from left to right according to an order of an image line in the sequence of the plurality of images to form the folder icon, and controlling the display section to display the folder icon as the folder icon of the image folder.

9. A non-transitory computer-readable recording medium having recorded thereon an image display program for controlling a computer of an image display apparatus including a display section and a storage section to perform functions comprising:
storing a plurality of sets of a theme of an image corresponded to a theme icon representing the theme in the storage section;
storing an image folder storing a sequence of a plurality of images in the storage section;
detecting an image theme of each image of the sequence of the plurality of images; and
controlling each theme icon corresponding to the image theme detected by the image theme detecting section to be aligned from left to right according to an order of an image line in the sequence of the plurality of images to form the folder icon, and controlling the display section to display the folder icon as the folder icon of the image folder.

* * * * *